UNITED STATES PATENT OFFICE.

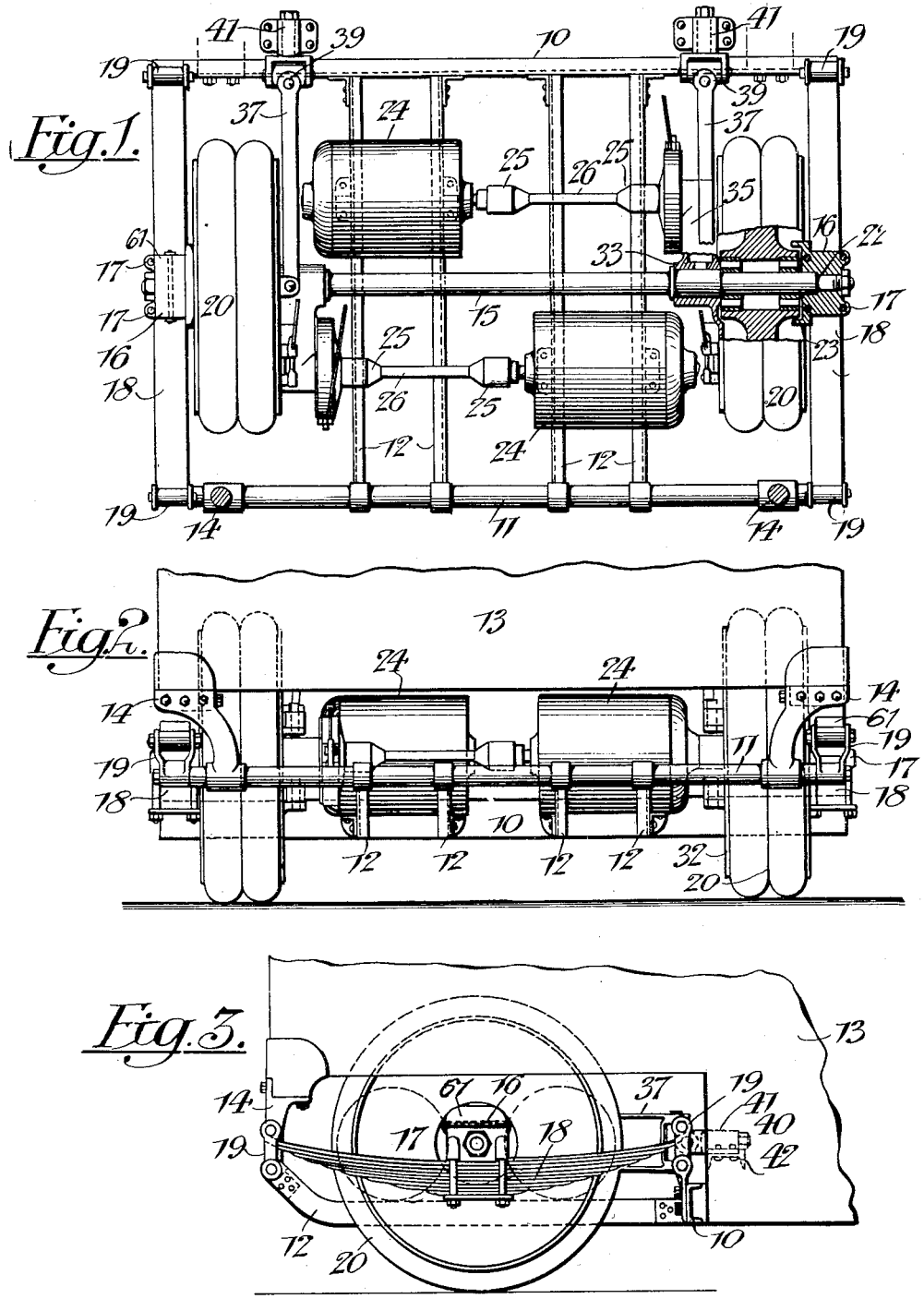

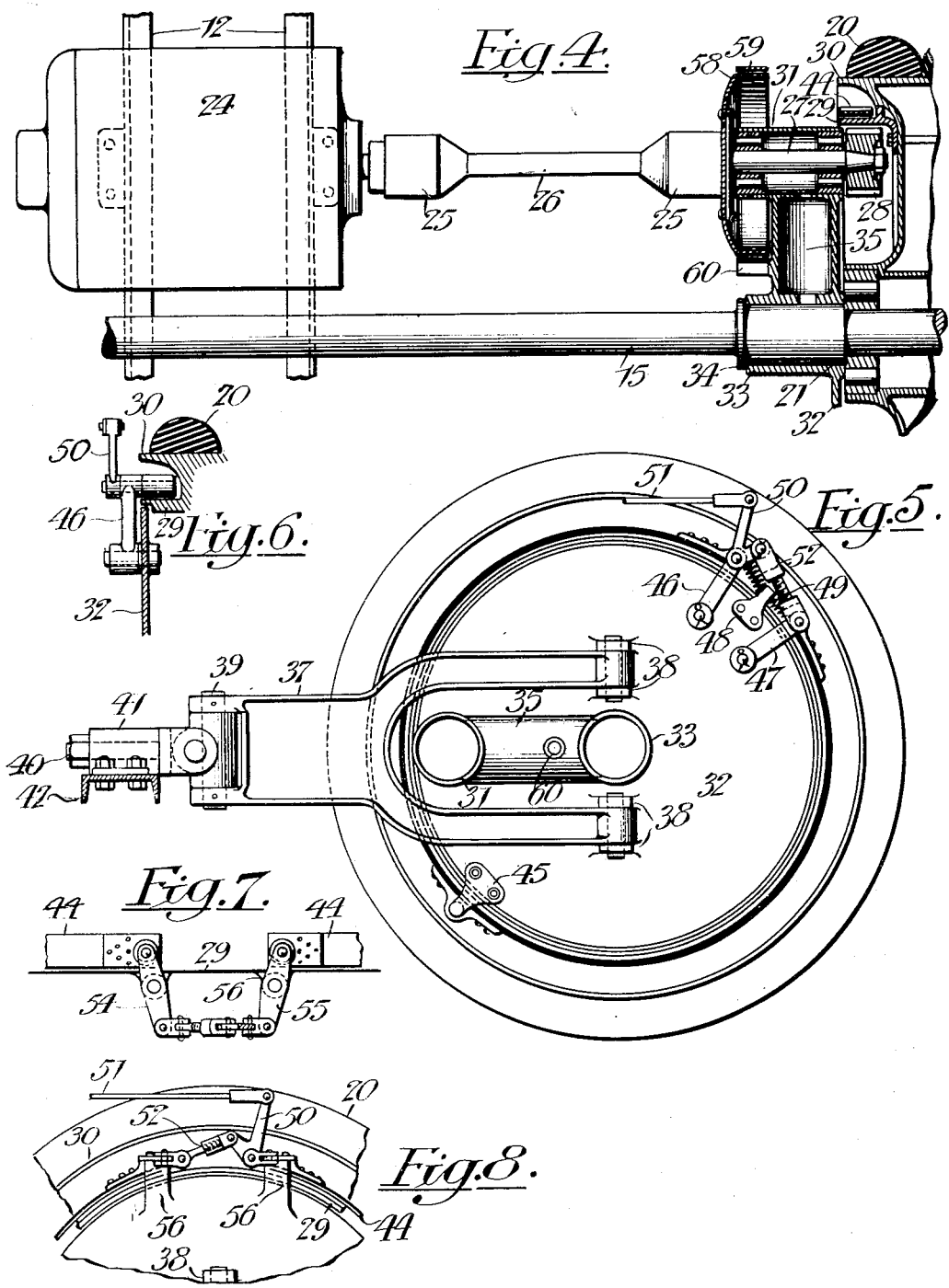

RAYMOND CILLEY, OF BROOKLYN, NEW YORK.

POWER-TRUCK FOR VEHICLES.

1,251,749. Specification of Letters Patent. Patented Jan. 1, 1918.

Application filed December 18, 1913. Serial No. 807,410.

*To all whom it may concern:*

Be it known that I, RAYMOND CILLEY, a citizen of the United States, and resident of New York city, borough of Brooklyn, in the county of Kings and State of New York, have invented certain new and useful Improvements in Power-Trucks for Vehicles, of which the following is a specification.

This invention relates to certain improvements in vehicles, and more particularly to the means for mounting the prime movers and transmitting the power therefrom to the traction wheels of the vehicle. My invention is particularly applicable for use where electric motors are used as the prime movers, and in its preferred form may be advantageously used in automobiles, although it is of course evident that it might be employed in any other form of motor vehicle.

The invention involves various important features of construction and arrangement of parts, all of which will be pointed out more particularly hereinafter, and defined in the claims.

The accompanying drawings to which reference is to be had and in which similar reference characters indicate corresponding parts in the several views, illustrate one main embodiment of my invention, but I wish it particularly understood that my invention is not limited to this specific form and that various changes may be made within the scope of the appended claims and without departing from the spirit of my invention. I wish the drawings to be considered in an illustrative rather than in a limiting sense.

In these drawings:

Figure 1 is a top plan view of a truck constructed in accordance with my invention, a portion of one wheel and its support being shown in section;

Fig. 2 is a rear view of the truck showing a portion of the body of the vehicle attached thereto;

Fig. 3 is a side view of the parts shown in Fig. 2;

Fig. 4 is a top plan view similar to a portion of Fig. 1, but on a larger scale, and showing a portion of the wheel and driving connections in section;

Fig. 5 is an inside face view of one of the vehicle wheels, and the parts attached thereto;

Fig. 6 is a sectional detail showing the mounting of the brake; and

Figs. 7 and 8 are details showing a slightly modified brake-applying means.

The body of my improved truck is formed of a front channel 10 extending transversely of the vehicle, a rear transversely extending bar 11, and a plurality of connecting braces or bars 12. The particular form of truck illustrated is designed for use with a bus, or carry-all of the low step, or stepless side entrance type. The body 13 of the bus extends across the top of the truck and also down the front end thereof, as is clearly indicated in Fig. 3. The truck is connected to the body by bolting the channel 10 thereto and securing the rear end of the body to brackets 14. Extending transversely of the vehicle and approximately midway between the front transverse member 10 and the rear transverse member 11 is the main axle 15 of the vehicle. This axle is non-rotatable and at its ends is threaded and rigidly secured to bearing blocks 16 by suitable nuts as shown. Each bearing block also serves as a spring clip and has bosses 17 projecting from the outer surface. The two leaf springs 18 extend lengthwise of the vehicle, and are rigidly clamped to the bearing blocks 16 in any suitable manner. The springs are of approximately the same length as the distance between the front and rear frame members 10 and 11, and are connected to the latter by shackles 19. The forming of the spring clips in this manner is an important feature of my invention, one of the advantages of which is that one part serves both as a bearing block and a spring clip and this part is made up of only a single piece bored to receive the end of the axle rather than being formed of two sections clamped together with the axle between. The mounting of these bearing blocks upon the extreme ends of the axles and the connecting of the springs to said bearing blocks involves another important feature, as it brings the springs outside of the vehicle wheels, and thus spaces the springs apart to the maximum distance transversely of the vehicle. This gives the body of the vehicle greater lateral stability and prevents rocking, although giving the full vertical resiliency.

Closely adjacent to the springs and mounted on the axle are two wheels 20 which support the truck. These wheels may be of any suitable character although the double tread form illustrated is very serviceable for ordinary traffic conditions. The bearings between each wheel and the axle may be of any suitable and approved form, although preferably anti-friction bearings of the roller type are incorporated. As shown particularly in Fig. 4, the axle presents a shoulder 21 to prevent endwise movement of the wheel in one direction and the bearing block or spring clip 16 prevents endwise movement in the opposite direction. Within the clip as is shown in Fig. 1, the axle is provided with a second shoulder 22 against which a portion of the clip abuts, so that by tightening the nut on the outer end of the axle the clip 16 may be rigidly held in place, and the wheel 20 retained, but not bound. Suitable washers may be placed on the axle and against either of the shoulders, although preferably against the second-mentioned shoulder, to take up any wear and allow the proper amount of free space between the shoulder 21 and the combined bearing block and spring clip 16. The latter preferably has an annular flange 23 encircling a portion of the hub of the wheel, so as to prevent the admission of dust and dirt to the bearings, although any other suitable means for the purpose may be provided.

For delivering power to the vehicle wheels, I provide two separate prime movers preferably electric motors 24, supported by the cross members 12 of the frame, and adjacent to and upon opposite sides of the axle 15. Each motor is positioned adjacent to one of the wheels and the power from each motor is delivered across the truck to the opposite wheel rather than to the one directly adjacent thereto. The axes of the motor are parallel to the shaft and the shaft of each motor is connected through two universal joints 25, 25 and an intermediate shaft section 26 to a shaft 27. The shaft 27 at its extreme end is provided with a driving pinion 28 meshing with an internal gear 29 carried by the wheel adjacent to but spaced from the periphery of the latter. The teeth of this gear 29 project inwardly from a cylindrical flange which is spaced inwardly a short distance from the rim 30 of the wheel. The shaft 27 is mounted in two sets of anti-friction bearings in a sleeve 31 carried at a fixed distance from the main axle 15 of the truck. The transmitting of the power across the vehicle from a motor at one side of the truck to the wheel at the opposite side of the truck, and the placing of the springs outside of the wheel, permits the sleeve 31 to be made of such length that the two bearings therein will be properly spaced and tilting and twisting movement of the shaft 27 will be properly resisted. At the same time it permits the intermediate shaft section 27 to be of such length between the two universal joints that under normal traffic conditions the shaft section 26 swings through only a small angle during the up and down movement of the vehicle body as the springs operate. It will be noted that the motors are connected to the frame of the truck and that the latter, as well as the vehicle body is supported by the springs. This relieves the motors of all jarring and bounding action to which the wheels are subjected in traveling over rough roads. I have not shown any details of the universal joints 25, as it is of course understood that any suitable universal joint suitable for the purpose can be employed.

For holding the pinion 28 in mesh with the internal gear of the wheel the sleeve 31 is made integral with or is rigidly connected to a plate 32, mounted on the axle and of a diameter approximately equal to the diameter of the internal gear 29. This plate at its center has a sleeve 33 closely fitting the axle 15 adjacent to the inner surface of the wheel. Preferably the axle has a flange 34 presenting a shoulder against which one end of the sleeve abuts, and the other end of the sleeve terminates in the same plane with the shoulder 21 of the axle. The inner race member of the roller bearing of the wheel may be made of a thickness slightly greater than the height of the shoulder 21, so that it will abut against the end of the sleeve 33, and thus the nut on the end of the axle not only holds the wheel in place and against endwise movement, but also holds the sleeve 33 of the plate 32. The construction of this plate and its method of mounting involves an important feature of my invention. The plate is preferably of cast steel and the portion between the sleeve 33 and the sleeve 31 is made in the form of a tube 34, which may be integral with both sleeves and with the body of the plate. In driving the wheel the power applied to the pinion 28 tends to make the pinion travel bodily either upwardly or downwardly along the internal gear dependent upon the direction of rotation and this tends to tilt the sleeve 31. Such a tilting would result in a twisting of the plate between the two sleeves but by making this portion of the plate in the form of a tube the strain in said tube is a torsional strain and is thus better resisted than it would be by a flat plate.

To prevent rotation of the plate 32 I provide the link brace construction illustrated particularly in Fig. 5. A brace 37 in the form of a fork has the ends of the two branches of the fork pivotally connected to lugs 38 on the face of the plate, the pivot pins being in alinement with each other and vertically disposed. The brace extends substantially horizontally and at its front end it is connected by a universal joint 39 to a bolt 40 adapted to be rigidly secured in a sleeve 41 clamped on a transverse channel or other frame member of the body of the car. This brace 37 with its pivotal and universal joint connections permits the body to move up and down with the springs and also permits such slight movements as are necessary when only one of the two wheels passes over an obstruction or into a depression in the roadway. In detaching the truck from the body of the car, it is merely necessary to remove the nuts on the front ends of the bolts 40 and unbolt the frame member 10 and brackets 14 from the body. The truck may then be moved rearwardly from beneath the body without raising the latter to only a very slight distance. The special features of construction hereinbefore described permit and render possible the improved brake construction illustrated. As previously noted the internal gear 29 is spaced from the rim of the wheel, so as to leave an annular chamber. The outer surface of this gear wheel is so formed as to constitute a brake drum and a band brake 44 is mounted in this annular chamber. The brake band intermediate of its ends may be connected to the plate 32 by a bracket 45 provided with a pin projecting laterally into the annular recess and the free ends of the brake drum may be provided with pins carried by links 46 and 47 pivoted to the outer surface of the plate 32. By swinging the outer ends of these links toward each other the brake band will be caused to grip the drum. For normally holding the brake in released position I may provide a bracket 48 between the two links and supporting a spring 49 acting against the ends of the brake band. For drawing the ends of the brake band together to operate the brake, various lever mechanism may be employed. As shown in Fig. 5 the pin at one end of the brake band is provided with a bell-crank lever 50 to one end of which is connected the operating rod or cable 51, and to the other is connected a link 52 leading to the pin at the other end of the brake band. This link 52 is preferably made of two movable sections, whereby its effective length may be varied to properly adjust it and to take up for stretching and wear. In Figs. 7 and 8 I have shown a slightly modified link connection in which levers 54 and 55 are pivoted on bosses or studs 56 on the plate 32. The inner ends of these levers project into the annular recess and are connected to the ends of the brake band 44, while the outer ends are connected by a bell crank lever 50 and a link 52 of adjustable length similar to corresponding parts shown in Figs. 5 and 6.

The brake above described is preferably employed as the emergency brake while as a service brake, I employ a brake drum 58 rigid with the shaft section 27. This may be made of a hollow casing of sheet metal encircling the end of the sleeve 31 adjacent to the universal joint 25. The brake band 59 may be supported on a stud 60 secured to the outer side of the tubular portion 35 which supports the sleeve 31 and the brake may be operated in any well-known manner. By placing the service brake at this point the braking strains are not transmitted through the universal joint and they are applied as closely as possible to the wheel itself.

It will be noted that either spring may be removed by the removal of three nuts including one at each end of the spring and one on the end of the axle, and that the removal of the spring does not disturb the relation of the spring leaves to each other. With the spring removed, the wheel may be radially slipped off the end of the axle without the removal or loosening of any other fastening members.

Also by placing the spring clip outside of the wheel and securing the spring itself to the under side of the clip, the upper side of the clip may serve as a support for a rubber bumper 61, which will engage with the under side of the frame on the body of the car when the springs approach their maximum distortion. This rubber bumper may be secured in place in any suitable manner, for instance the bearing block 16 may have a flat upper side, as shown in Fig. 3 upon which the bumper may rest and clips at the ends of the flat surface through which a bolt may extend as shown in dotted lines in Figs. 1 and 3.

Having thus described my invention, what I claim as new and desire to protect by Letters-Patent, is:

1. A truck including a frame having front and rear transverse members, an axle disposed therebetween and substantially parallel thereto, wheels mounted on said axle, springs having their opposite ends connected to said frame members and having their intermediate portions secured to said axle, two separate electric motors supported on said frame one adjacent each wheel, and driving connections between each motor and the opposite wheel.

2. A truck including a frame having front and rear transverse members, an axle disposed therebetween and substantially parallel thereto, wheels mounted on said axle, springs having their opposite ends connected to said frame members and having their intermediate portions suspended from said axle, two separate electric motors supported on said frame one adjacent each wheel, and driving connections between each motor and the opposite wheel.

3. A truck including a frame having front and rear transverse members, an axle disposed therebetween and substantially parallel thereto, wheels mounted on said axle, springs having their opposite ends connected to said frame members and having their intermediate portions secured to said axle, two separate electric motors supported on said frame one adjacent each wheel, and driving connections between each motor and the opposite wheel, said springs being disposed adjacent the outer sides of said wheels.

4. A truck including a frame having front and rear transverse members, an axle disposed therebetween and substantially parallel thereto, wheels mounted on said axle, springs having their opposite ends connected to said frame members and having their intermediate portions rigidly secured to the terminal portions of said axle and disposed beneath the latter, two separate electric motors supported on said frame one adjacent each wheel, and driving connections between each motor and the opposite wheel.

5. In combination, an axle, a traction wheel mounted thereon, a gear secured thereto, a plate adjacent one end of said wheel and having a sleeve mounted on said axle, a second sleeve parallel thereto, and radially disposed tubular connection between said sleeves, a shaft journaled in said second sleeve, a pinion on one end of said shaft meshing with said gear and means for applying power to the opposite end of said shaft.

Signed at New York city in the county of New York and State of New York this twelfth day of December A. D. 1913.

RAYMOND CILLEY.

Witnesses:
C. W. FAIRBANK,
FLORENCE LEVIEN.